United States Patent

Furumoto et al.

[11] Patent Number: 4,939,900
[45] Date of Patent: Jul. 10, 1990

[54] HYDRAULICALLY OPERATED CONTINUOUSLY VARIABLE TRANSMISSION

[75] Inventors: Mitsumasa Furumoto; Eiichiro Kawahara; Kenichi Ikejiri; Noboru Yamamoto, all of Saitama, Japan

[73] Assignee: Honda Giken Kogyo Kabushiki Kaisha, Tokyo, Japan

[21] Appl. No.: 122,891

[22] Filed: Nov. 19, 1987

[30] Foreign Application Priority Data

Nov. 19, 1986 [JP] Japan ................. 61-275757

[51] Int. Cl.⁵ .................................... F16D 31/02
[52] U.S. Cl. ........................... 60/456; 60/487; 60/488; 184/6.17
[58] Field of Search ............. 60/487, 488, 489–492, 60/325, 456, 468; 91/486, 487, 488, 489; 184/6.17

[56] References Cited

U.S. PATENT DOCUMENTS

| | | |
|---|---|---|
| 2,721,519 | 10/1955 | Henrichsen . |
| 3,108,544 | 10/1963 | Pesce . |
| 3,230,699 | 1/1966 | Hann et al. ............. 60/456 X |
| 3,240,159 | 3/1966 | Andrews et al. . |
| 3,364,680 | 1/1968 | Osojnak ................. 60/489 |
| 3,442,153 | 5/1969 | Ross . |
| 3,555,817 | 1/1971 | Hann . |
| 3,581,498 | 6/1971 | Cudnohufsky . |
| 3,866,422 | 2/1975 | Kersten ................. 60/456 |
| 3,866,518 | 2/1975 | Miyao . |
| 4,087,969 | 5/1978 | Takahashi et al. . |
| 4,158,290 | 6/1979 | Cornell . |
| 4,183,288 | 1/1980 | Miyao ................... 91/488 |
| 4,274,505 | 6/1981 | Maust ................. 60/487 X |
| 4,341,133 | 7/1982 | Sakamoto . |
| 4,382,399 | 5/1983 | Lotter .................. 91/486 |
| 4,444,093 | 4/1984 | Koga et al. . |
| 4,478,134 | 10/1984 | Kawahara et al. . |
| 4,503,928 | 3/1985 | Mallen-Herrero . |
| 4,637,293 | 1/1987 | Yamaguchi . |
| 4,646,520 | 3/1987 | Furumoto . |

FOREIGN PATENT DOCUMENTS

| | | |
|---|---|---|
| 0056865 | 8/1982 | European Pat. Off. . |
| 54-141948 | 11/1979 | Japan . |
| 56-143857 | 11/1981 | Japan . |
| 57-70968 | 5/1982 | Japan . |
| 57-76357 | 5/1982 | Japan . |
| 163704 | 10/1982 | Japan .................. 60/456 |
| 59-44535 | 10/1984 | Japan . |
| 61-118566 | 6/1986 | Japan . |
| 902978 | 8/1962 | United Kingdom . |

OTHER PUBLICATIONS

Circuits de Transmissions, "Applications classiques . . . ," pp. (B 5616) 8-11, with English-language translation, (no date).

Primary Examiner—Edward K. Look
Attorney, Agent, or Firm—Lyon & Lyon

[57] ABSTRACT

A hydraulic motor and a hydraulic pump are interconnected by a closed hydraulic circuit. A lubricating chamber is defined around the sliding surfaces of the swash plate and the plungers of at least one of the hydraulic pump and the hydraulic motor. A shuttle valve has two input ports connected to respective oil passages, the shuttle valve being shiftable to connect the one of the oil passages which is of lower oil pressure to the output port of the shuttle valve when the differential pressure between the oil passages is relatively large. A first relief valve is opened to communicate the output port to the lubricating chamber when the oil pressure in the output port exceeds a first pressure level. A second relief valve connected between the first relief valve and the lubricating chamber is opened when the oil pressure between the first relief valve and the lubricating chamber exceeds a second pressure level lower than the first pressure level.

13 Claims, 4 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously variable transmission having valve means for selectively supplying oil from a closed hydraulic circuit to a lubricating chamber in at least one of a hydraulic pump and a hydraulic motor, dependent on the load on the hydraulic motor.

Hydraulically operated continuously variable transmissions are known in the art as disclosed in Japanese Laid-Open Patent Publication No. 57-76357, for example.

In such hydraulically operated continuously variable transmissions, when the load driven by the hydraulic motor is increased upon acceleration or the engine braking load is increased upon deceleration, the hydraulic pressure in a higher-pressure portion of the closed hydraulic circuit is also increased, and so are the loads on the sliding surfaces of the shoes and the swash plates of the hydraulic pump and the hydraulic motor. Therefore, the sliding surfaces generate an increased amount of heat which may cause seizure and wear on the swash plates and the shoes.

In order to overcome the above problem, it has been proposed to provide lubricating chambers around the sliding surfaces of shoes and swash plates and supply cooling oil under pressure to the lubricating chamber with a pump, as disclosed in Japanese Laid-Open Patent Publication No. 61-118566. If the displacement of the oil supply pump is selected in order to sufficiently cool the sliding surfaces when the amount of heat generated is large, then the sliding surfaces will be excessively cooled when the load is small, and the temperature of the sliding surfaces will become too low, thereby increasing the viscosity of the lubricating oil and reducing the machine efficiency.

SUMMARY OF THE INVENTION

In view of the aforesaid difficulties, it is an object of the present invention to provide a hydraulically operated continuously variable transmission capable of cooling and lubricating the sliding surfaces of plungers and a swash plate according to the amount of heat generated by the sliding surfaces.

According to the present invention, there is provided a hydraulically operated continuously variable transmission comprising a hydraulic motor having a motor swash plate and a motor cylinder supporting an annular array of slidable motor plungers held in slidable contact with the motor swash plate through mutually sliding surfaces which are supplied with oil from the pump cylinder for lubrication thereof, a hydraulic pump having a pump swash plate and a pump cylinder supporting an annular array of slidable pump plungers held in slidable contact with the pump swash plate through mutually sliding surfaces which are supplied with oil from the pump cylinder for lubrication thereof, a closed hydraulic circuit interconnecting the hydraulic pump and the hydraulic motor, the hydraulic pump having inlet and outlet ports connected to the closed hydraulic circuit, a lubricating chamber surrounding the sliding surfaces of the swash plate and the plungers of at least one of the hydraulic pump and the hydraulic motor, a pair of oil passages having ends connected to the inlet and outlet ports, respectively, a shuttle valve having two input ports connected to the other ends of the oil passages, respectively, and an output port, the shuttle valve being shiftable to connect one of the oil passages which is of lower oil pressure to the output port when the differential pressure between the oil passages is relatively large, a first relief valve connected to the output port and openable to communicate the output port to the lubricating chamber when the oil pressure in the output port exceeds a first pressure level, and a second relief valve connected between the first relief valve and the lubricating chamber and openable when the oil pressure between the first relief valve and the lubricating chamber exceeds a second pressure level lower than the first pressure level.

When the hydraulic motor undergoes a large load, the oil passage of lower oil pressure is connected to the first relief valve by the shuttle valve, and the first relief valve is opened to deliver oil from the closed hydraulic circuit to the lubricating chamber. Therefore, under the large load, the lubricating chamber is supplied with oil from the cylinder and also oil from the closed hydraulic circuit. At the time the oil pressure in the lubricating chamber is excessively increased, the second relief valve is opened to release the oil pressure from the lubricating chamber. Thus, the oil pressure in the lubricating chamber is prevented from becoming higher than the pressure level for opening the first relief valve, with the result that the oil in the closed hydraulic circuit is normally flushed. When the load on the hydraulic motor is small, the shuttle valve is not operated, and oil is supplied to the lubricating chamber only from the cylinder.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
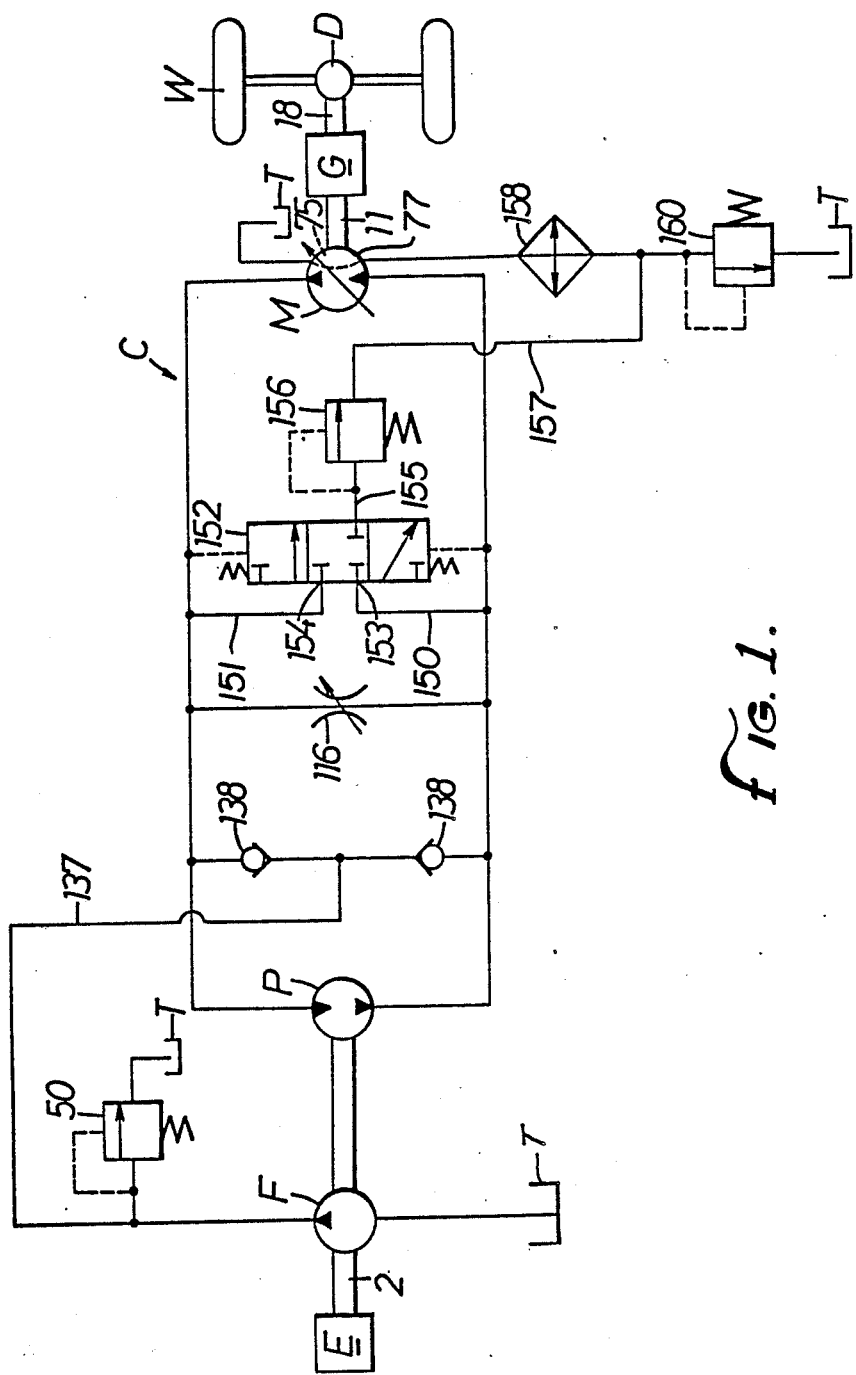
FIG. 1 circuit arrangement of a hydraulically operated continuously variable transmission according to the present invention.

FIG. 1 shows a hydraulically operated continuously variable transmission CVT according to the present invention for use on a motor vehicle such as an automobile, the transmission CVT basically comprising a hydraulic pump P of the fixed displacement type coupled to an input shaft 2 driven by an engine E and a hydraulic motor M of the variable displacement type disposed coaxially with the hydraulic pump P. The hydraulic pump P and the hydraulic motor M are coupled in a closed hydraulic circuit C. The hydraulic motor M is operatively coupled to wheels W through an output shaft 11, a forward/reverse gear assembly G, an auxiliary shaft 18, and a differential D.

The hydraulic pump P has inlet and outlet ports connected to each other through a clutch valve 116. The input shaft 2 drives a replenishing pump F having an outlet port connected to the closed hydraulic circuit C through a replenishing oil passage 137 and a pair of check valves 138. The replenishing pump F, when actuated, supplies working oil from an oil tank T through the replenishing oil passage 137 to the closed hydraulic circuit C to compensate for an oil shortage in the circuit C. A pressure control valve 50 is connected to the replenishing oil passage 137. When the oil pressure in the replenishing oil passage 137 exceeds a prescribed pressure level, the pressure control valve 50 is opened to keep the oil pressure discharged from the replenishing pump F at a constant level.

The hydraulic motor M has a lubricating chamber 75. When the transmission is subjected to a high load, the lubricating chamber 75 is supplied with oil from a lower-pressure portion of the closed hydraulic circuit C through an oil cooling unit 158 in response to operation of a shuttle valve 152 and a first relief valve 156. When the oil pressure in the lubricating chamber 75 is increased, a second relief valve 160 is actuated to lower the oil pressure in the lubricating chamber 75.

The clutch valve 116 comprises a restriction valve switchable between an open position in which the inlet and outlet ports of the hydraulic pump P are interconnected and a fully closed position in which the inlet and outlet ports of the hydraulic pump P are disconnected from each other, the clutch valve 116 having an intermediate open position. When the clutch valve 116 interconnects the inlet and outlet ports of the hydraulic pump P, no oil pressure is supplied to the hydraulic motor M and hence the transmission is in a neutral condition with the hydraulic motor M being inoperative. When the clutch valve 116 disconnects the inlet and outlet ports of the hydraulic pump P from each other, working oil circulates between the hydraulic pump P and the hydraulic motor M to transmit driving power to thereby cause the motor vehicle to run. When the clutch valve 116 is in the intermediate open position, working oil circulates at a rate dependent on the opening of the clutch valve 116, which is thus held in a "partly engaged" condition.

The structure of the continuously variable transmission CVT will be described in detail with reference to FIG. 2. The continuously variable transmission CVT is housed in a transmission case 1 composed of a pair of longitudinally separate case members 1a, 1b.

The hydraulic pump P has a pump cylinder 4 splined at 3 to the input shaft 2, a plurality of cylinder holes or bores 5 defined in the pump cylinder 4 in a circular pattern around the input shaft 2, and a plurality of pump plungers 6 slidably fitted respectively in the cylinder holes 5. The power of the engine (not shown in FIG. 2) is transmitted through a flywheel 7 to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which output and support shafts 11, 12 are coaxially mounted, respectively. The output shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the output shaft 11. A plurality of needle bearings 15 are disposed between the inner surface of the output shaft 11 and the outer surface of the input shaft 2, so that the input shaft 2 and the pump cylinder 4, and the output shaft 11 and the motor cylinder 8 are relatively rotatable.

Parallel to the output shaft 11, the auxiliary shaft 18 is rotatably supported on the opposite end walls of the transmission case 1 by a roller bearing 16 and a ball bearing 17. The forward/reverse gear assembly G is located between the auxiliary shaft 18 and the output shaft 11.

The forward/reverse gear assembly G comprises a pair of driver gears 19, 20 fixedly mounted on the output shaft 11, a driven gear 21 rotatably supported on the auxiliary shaft 18 in mesh with the driver gear 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of the differential D. In response to operation of the clutch member 25, the differential D is operated selectively in forward and reverse directions of the motor vehicle.

Figure 3:
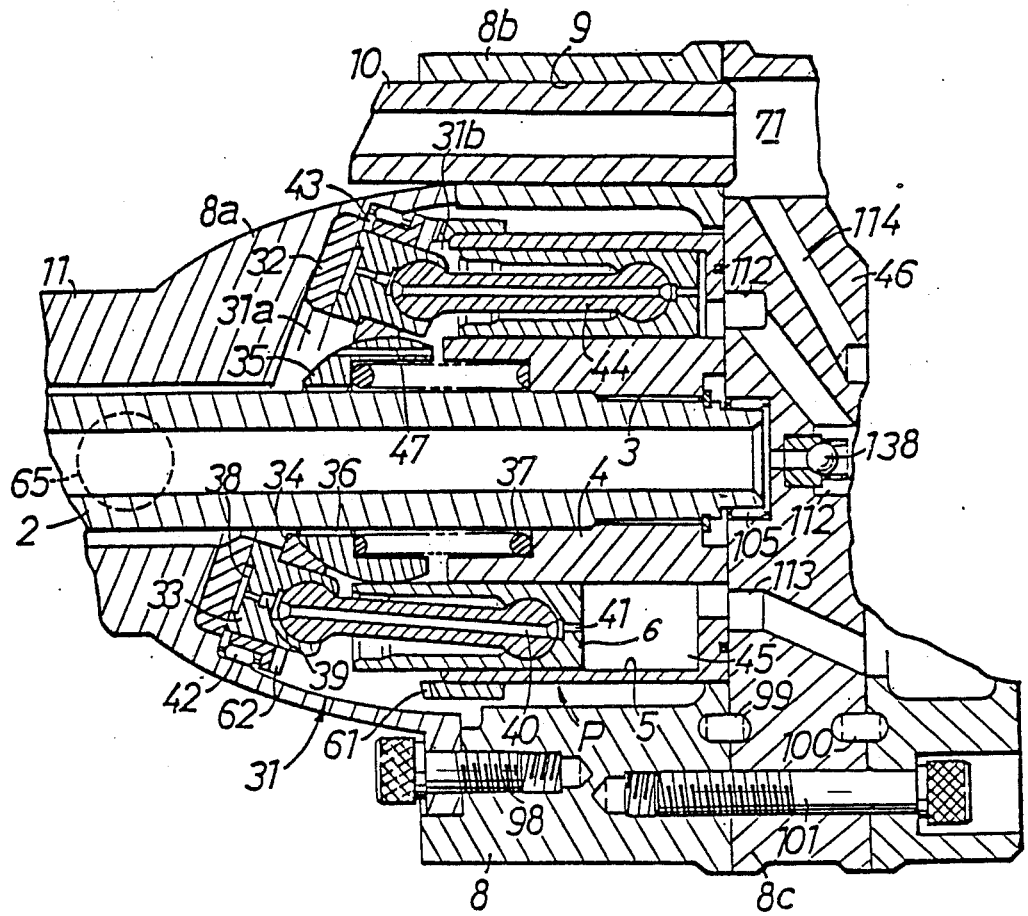
FIG. 3 is an enlarged fragmentary cross-sectional view of a portion of the hydraulically operated continuously variable transmission shown in FIG. 2.

As shown in FIG. 3, a hydraulically hermetic chamber 31 is defined between the motor cylinder 8 and the pump cylinder 4, and a pump swash plate 32 is supported in the chamber 31 inwardly of the motor cylinder 8 in a facing relation to the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevent rotation of the spring holder 35 relative to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from these sliding surfaces flow into the first chamber 31a. To lubricate the sliding surfaces of the pump swash plate 32 and the pump shoe 33, an annular hydraulic pocket 38 is defined in the front surface of the pump shoe 33 and communicates through oil holes 39, 40, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricating the sliding surfaces of the pump shoe 33 and the pump swash plate 32. At the same time, oil pressure in the hydraulic pocket 38 is applied to the pump shoe 33 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 into the lubricating chamber 43 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33.

Into the second chamber 31b, there flows oil from the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chambers 31a, 31b are held in communication with each other.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

Figure 4:
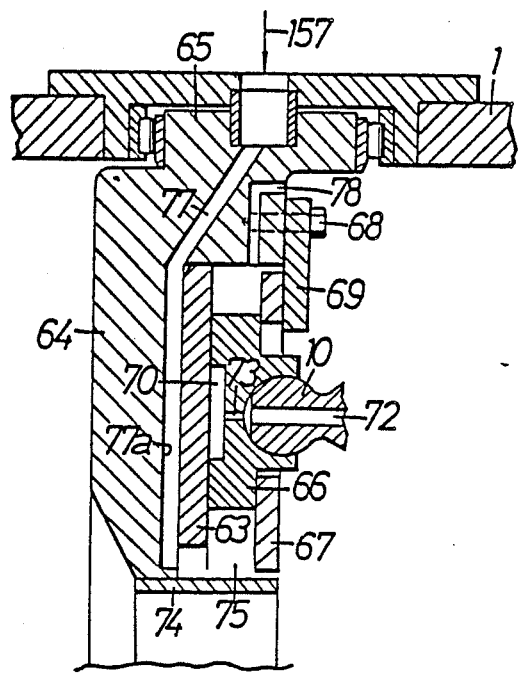
FIG. 4 is an enlarged fragmentary cross-sectional view of a portion of a hydraulic motor in the hydraulically operated continuously variable transmission.

In the hydraulic motor M, as shown in FIG. 4, an annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions. The presser plate 67 is therefore rotatable with the motor shoes 66.

Each of the motor shoes 66 has a hydraulic pocket 70 defined in its front face slidably contacting the motor swash plate 63. Oil chambers 71 (FIG. 2) defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thrust of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of a presser plate 67 with a small gap therebetween. The partition 74, the swash plate holder 64, and the presser plate 67 jointly define a lubricating chamber 75 accommodating the sliding surfaces of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approached the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

An inlet oil passage 77 is defined in the swash plate holder 64 and extends through the trunnion shaft 65 to the lubricating chamber 75. An outlet oil passage 78 is also defined in the swash plate holder 64 and extends from the lubricating chamber 75 into the transmission case 1. The inlet oil passage 77 is supplied with lubricating oil.

The inlet oil passage 77 is partly defined as a recess 77a closed by the bottom of the motor swash plate 63, which is cooled by oil flowing through the recess 77a.

Figure 2:
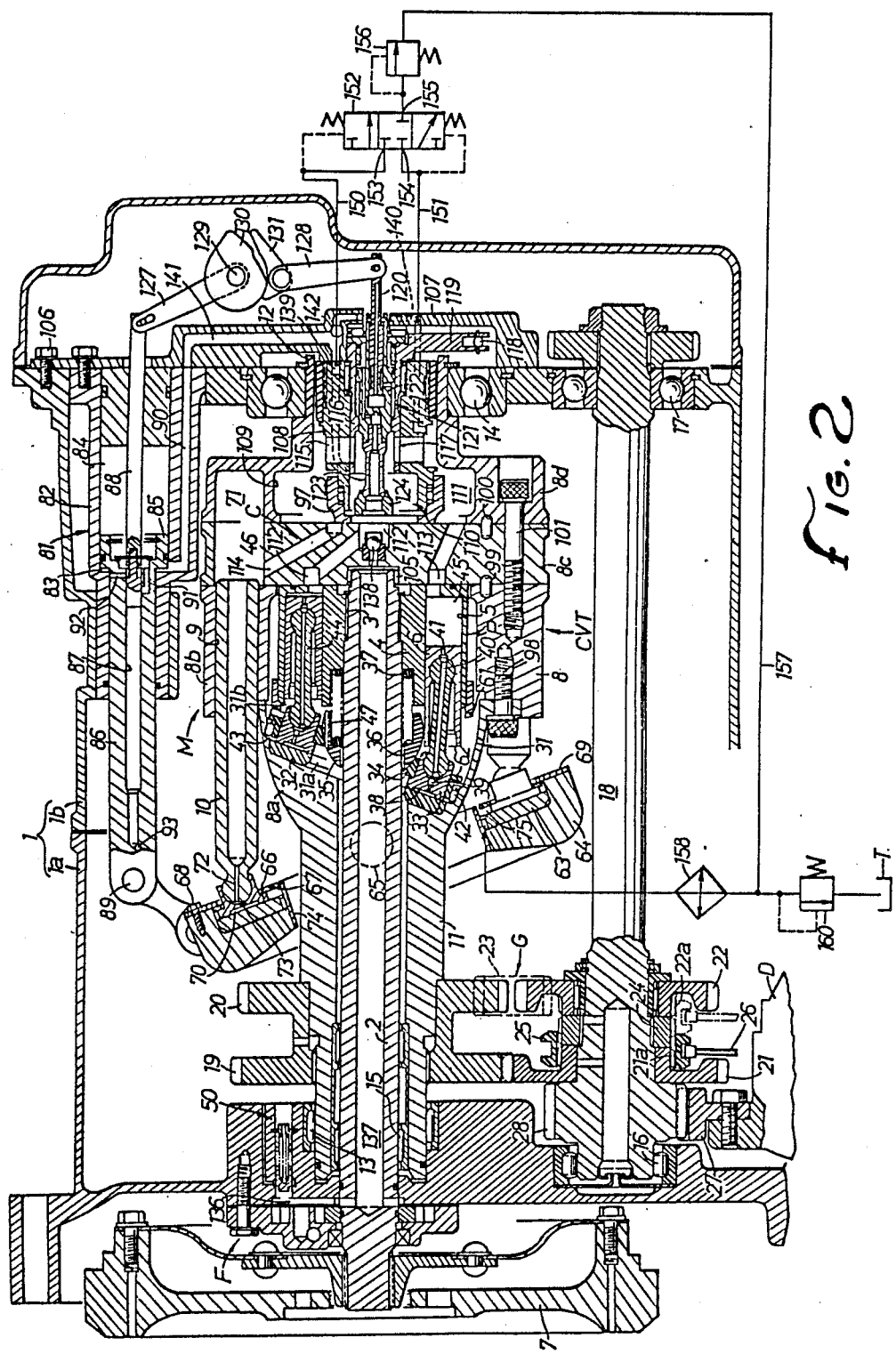
FIG. 2 is a longitudinal cross-sectional view of the hydraulically operated continuously variable transmission.

As shown in FIG. 2, a servomotor 81 for tilting the swash plate holder 64, i.e., the motor swash plate 63, is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with the oil tank T at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63, can be angularly shifted or adjusted between the most inclined position (as shown) and the right-angle position where the motor swash plate 63 lies perpendicularly to the motor plungers 10. Upon rotation of the motor cylinder 8, the motor swash plate 63 reciprocally moves the motor plungers 10 into and out of the cylinder holes 9. The stroke of the motor plungers 10 can continuously be adjusted by the inclination of the motor swash plate 63.

The closed hydraulic circuit C is formed between the hydraulic pump P and the hydraulic motor M through the distribution member 46 and a distribution ring 97. When the pump cylinder 4 is rotated by the input shaft 2, the high-pressure working oil discharged from the pump chambers 45 by therein the pump plungers 6 in the discharge stroke flows into the oil chambers 71 of the cylinder holes 9 containing therein the motor plungers 10 which are in the expansion stroke. Working oil discharged from the oil chambers 71 by therein the motor plungers 10 in the compression stroke flows back into the pump chambers 45 containing therein the pump plungers 6 in the suction stroke. During this time, the motor cylinder 8, i.e., the output shaft 11, is rotated by the sum of the reactive torque applied by the pump plungers 6 in the discharge stroke to the motor cylinder 8 through the pump swash plate 32 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = \frac{1}{1 + \frac{\text{Displacement of hydraulic motor } M}{\text{Displacement of hydraulic pump } P}}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the output shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinder 4 is resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that contain the pump plungers 6 operating in the discharge stroke and the inner chamber 110. The inlet port 113 provides fluid communication between the pump chambers 45 that contain the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112 via the inner chamber 110, and those communication ports 114 which communicate with the inner chamber 110 into the oil chambers 71 containing the motor plungers 10 which are in the expansion stroke, thereby imposing a thrust on these motor plungers 10. Working oil discharged by the motor plungers 10 operating in the compression stroke flows through those communication ports 114 which communicate with the outer chamber 111 and the inlet port 113 into the pump chambers 45 containing the pump plungers 6 in the suction stroke. Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. A cylindrical clutch valve 116 is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to a clutch control device (not shown) is connected. The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" (partly engaged) position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 120. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 73 is vertically positioned (as viewed in FIG. 2) for the transmission ratio of 1. With the outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicating with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover valve 142 operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by an actuator (not shown), the shaft 129 having a cam 130 supported thereon. The other end of the link 128 supports thereon a cam follower 131 slidingly contacting the cam 130. When the servomotor 81 is operated to vertically position the motor swash plate 63, the servomotor 121 is operated by the link 127, the cam 130, the cam follower 131, and the link 128 to enable the closure valve 124 to close the outlet port 112.

The replenishing pump F is mounted on an outer surface of the end wall of the case member 1a. The replenishing pump F is driven by the input shaft 2 for feeding, under a constant pressure, working oil from the oil tank on the bottom of the transmission case 1. The replenishing pump F has an outlet port 136 communicating through an axial central oil passage 137 defined in the input shaft 2 with the inner chamber 110 via a check valve 138 and also with the outer chamber 111 via another check valve (not shown). The replenishing pump F therefore supplies oil to automatically compensate for any oil leakage from the closed hydraulic circuit composed of the hydraulic pump P and the hydraulic motor M. Connected to the outlet port 136 of the replenishing pump F is the pressure control valve 50 which is disposed in the end wall of the case member 1a for keeping the oil pressure discharged from the replenishing pump F at a substantially constant level.

In the closed hydraulic circuit C connecting the hydraulic pump P and the hydraulic motor M, the oil passage 139 defined on the discharge side of the hydraulic pump P, i.e., connected to the inner chamber 110, is coupled to one end of an oil passage 150, and the oil passage 140 defined on the suction side of the hydraulic pump P, i.e., connected to the outer chamber 111, is coupled to one end of an oil passage 151. The other ends of the oil passages 150, 151 are coupled respectively to input ports 153, 154 of the shuttle valve 152.

The shuttle valve 152 is selectively switchable between three positions, i.e, an intermediate position in which fluid communication between the input ports 153, 154 and an output port 155 thereof is cut off, a lower-end position in which the input port 153 communicates with the output port 155, and an upper-end position in which the input port 154 communicates with the output port 155. The oil pressure from the oil passage 150 is applied to shift the shuttle valve 152 into the upper-end position, and the oil pressure from the oil passage 151 is applied to shift the shuttle valve 152 into the lower-end position. Thus, if the differential pressure between the oil passages 150, 151 is large, the shuttle valve 152 is shifted to the lower-end position or the upper-end position so that the oil passage 150 or 151 which is of lower oil pressure will communicate with the output port 155.

The inlet oil passage 77 communicating with the lubricating chamber 75 and the output port 155 of the shuttle valve 152 are coupled to each other through an oil passage 157 having the first relief valve 156 and the oil cooling unit 158. The first relief valve 156 is opened when the oil pressure of the output port 155 is in excess of a prescribed pressure level.

The oil passage 157 between the first relief valve 157 and the oil cooling unit 158 is connected to the oil tank T through the second relief valve 160 which can be opened by an oil pressure in the oil passage 157 that is lower than the prescribed pressure level for opening the first relief valve 156.

Operation of the hydraulically operated continuously variable transmission thus constructed is as follows:

At the time of acceleration of the motor vehicle when a large load is applied to the hydraulic motor M, high-pressure oil is discharged from the hydraulic pump P into the inner chamber 110. The differential pressure between the oil passage 150 communicating with the inner chamber 110 and the oil passage 151 communicating with the outer chamber 111 is increased to shift the shuttle valve 152 into the upper-end position for thereby communicating the oil passage 151 with the output port 155. The first relief valve 156 is now opened to allow lubricating oil to be supplied from the closed hydraulic circuit C into the lubricating chamber 75. Therefore, the lubricating chamber 75 is supplied with oil from the oil chambers 71 and also oil from the closed hydraulic circuit C.

Upon deceleration of the motor vehicle under a high load, high-pressure oil is discharged from the hydraulic motor M into the outer chamber 111. The oil pressure in the oil passage 151 communicating with the outer chamber 111 becomes higher than the oil pressure in the oil passage 150 communicating with the inner chamber 110, so that the shuttle valve 152 is shifted to the lower end position. The oil passage 150 is now brought into communication with the output port 155 to open the first relief valve 156, which supplies oil from the closed hydraulic circuit C to the lubricating chamber 75. Therefore, as when the motor vehicle is accelerated, the lubricating chamber 75 is supplied with oil from the oil chambers 71 and also oil from the closed hydraulic circuit C.

Consequently, under a high load, since the lubricating chamber 75 is supplied with oil from the oil chambers 71 and also oil from the closed hydraulic circuit C, the sliding surfaces of the motor swash plate 63 and the motor shoe 66 are supplied with a relatively large amount of oil and hence are sufficiently cooled and lubricated thereby.

Under a lower load, the differential pressure between the inner and outer chambers 110, 111, i.e., the oil passages 150, 151 is small, and the shuttle valve 152 remains in the intermediate position. The lubricating chamber 75 is supplied with oil only from the oil chambers 71, so that the sliding surfaces of the motor swash plate 63 and the motor shoe 66 are prevented from being excessively cooled.

Inasmuch as the pressure setting for opening the second relief valve 160 is lower than that for opening the first relief valve 156, the oil pressure in the lubricating chamber 75 is kept lower than the pressure setting for the first relief valve 156 by the second relief valve 160 even when a pressure buildup is developed in the lubricating chamber 75 due to increased oil leakage from the sliding surfaces the motor swash plate 63 and the motor shoe 66 at the time the hydraulic motor M operates at high speed or under high load. The oil in the closed hydraulic circuit C can well be flushed to prevent the temperature in the closed hydraulic circuit C from rising and also to prevent the hydraulic motor M from decreasing in durability.

The second relief valve 160 is effective in protecting the oil cooling unit 158 from excessive oil pressures higher than its allowable pressure resistance. Thus, the oil cooling unit 158 is increased in durability.

In the illustrated embodiment, the lubricating chamber 75 of the hydraulic motor M is supplied with additional oil. However, it is also possible to supply the lubricating chamber 43 of the hydraulic pump P with additional oil.

With the arrangement of the present invention, as described above, the lubricating oil is defined around the sliding surfaces of the swash plate and the plungers of one of the hydraulic pump and the hydraulic motor. Oil passages have ends connected to the inlet and outlet ports of the hydraulic pump in the closed hydraulic circuit, and the other ends coupled to the input ports of the shuttle valve. When the differential pressure between the oil passages is large, the shuttle valve communicates the oil passage of lower oil pressure with the output port of the shuttle valve. The output port of the shuttle valve is connected to the lubricating chamber through the first relief valve which is opened when the oil pressure at the output port of the shuttle valve exceeds a prescribed pressure setting. Therefore, an amount of oil dependent on the magnitude of the load imposed on the hydraulic motor is delivered to the lubricating chamber wherein the sliding surfaces can be cooled and lubricated according to changes in the amount of heat generated by the sliding surfaces dependent on the magnitude of the load.

Since the second relief valve which can relieve oil pressure at a pressure setting lower than that for the first relief valve is connected between the first relief valve and the lubricating chamber, the oil pressure in the lubricating chamber remains lower than the pressure setting for the first relief valve while the hydraulic motor operates at high speed or under high load. The oil in the closed hydraulic circuit is sufficiently flushed to prevent the oil temperature from being increased, so that the hydraulic motor is of increased durability.

Although a certain preferred embodiment has been shown and described, it should be understood that many changes and modifications may be made therein without departing from the scope of the appended claims.

What is claimed is:

1. A hydraulically operated continuously variable transmission comprising:
    a hydraulic motor having a motor swash plate and a motor cylinder supporting an annular array of slidable motor plungers held in slidable contact with said motor swash plate through mutually sliding surfaces which are supplied with oil from said pump cylinder for lubrication thereof;
    a hydraulic pump having a pump swash plate and a pump cylinder supporting an annular array of slidable pump plungers held in slidable contact with said pump swash plate through mutually sliding surfaces which are supplied with oil from said pump cylinder for lubrication thereof;
    a closed hydraulic circuit interconnecting said hydraulic pump and said hydraulic motor, said hydraulic pump having inlet and outlet ports connected to said closed hydraulic circuit;
    a lubricating chamber surrounding the sliding surfaces of the swash plate and the plungers of at least one of said hydraulic pump and said hydraulic motor;
    a pair of oil passages having ends connected to said inlet and outlet ports, respectively;

a shuttle valve having two input ports connected to the other ends of said oil passages, respectively, and an output port, said shuttle valve being shiftable to connect one of said oil passages which is of lower oil pressure to said output port when the differential pressure between said oil passages is relatively large;

a first relief valve connected to said output port and openable to communicate said output port to said lubricating chamber when the oil pressure in said output port exceeds a first pressure level; and a second relief valve connected between said first relief valve and said lubricating chamber and openable when the oil pressure between said first relief valve and said lubricating chamber exceeds a second pressure level lower than said first pressure level.

2. A hydraulically operated continuously variable transmission according to claim 1, further including an oil cooling unit connected between said second relief valve and said lubricating chamber.

3. The transmission of claim 1, wherein said shuttle valve includes two opposed hydraulic means for causing the shifting, and said other ends of said pair of oil passages are separately connected to said two proposed hydraulic means for the differential pressure between said pair of oil passages to cause the shifting of the shuttle valve.

4. The transmission of claim 1, wherein said lubricating chamber surrounds said hydraulic motor.

5. A hydraulically operated continuously variable transmission of the type having a hydraulic pump and a hydraulic motor connected by a closed hydraulic circuit, comprising: a lubricating chamber communicating with sliding surfaces of at least one of said hydraulic pump and said hydraulic motor, and means for selectively connecting said closed hydraulic circuit to said lubricating chamber during a condition of high load on said sliding surfaces for supplying lubricating oil to said lubricating chamber and sliding surfaces and including means for limiting the pressure of the supplied lubricating oil wherein said pressure limiting means includes pressure relief valve means for preventing the supply of oil to the lubricating chamber at pressures above and below a predetermined range.

6. The transmission of claim 5, wherein said pressure relief valve means includes a first relief valve for supplying oil only when the pressure exceeds a predetermined magnitude in the oil supply from the closed hydraulic circuit.

7. A hydraulically operated continuously variable transmission of the type having a hydraulic pump and a hydraulic motor connected by a closed hydraulic circuit, comprising:

a lubricating chamber communicating with sliding surfaces of at least one of said hydraulic pump and said hydraulic motor; and means for selectively connecting said closed hydraulic circuit to said lubricating chamber during a condition of high load on said sliding surfaces for supplying lubricating oil to said lubricating chamber and sliding surfaces and including means for limiting the pressure of the supplied lubricating oil, said pressure limiting means including pressure relief valve means for preventing the supply of oil to the lubricating chamber at pressures above or below a predetermined range;

wherein said pressure relief valve means includes a first relief valve for supplying oil only when the pressure exceeds a predetermined magnitude in the oil supply from the closed hydraulic circuit and a second relief valve for preventing the oil pressure in the oil supplied to said lubricating chamber from exceeding a predetermined level.

8. A hydraulically operated continuously variable transmission of the type having a swash plate type hydraulic pump and a swash plate type hydraulic motor connected by a closed hydraulic circuit, comprising: a lubricating chamber communicating with a sliding surface of the swash plate of at least one of said hydraulic pump and said hydraulic motor, and means for selectively connecting said closed hydraulic circuit to said lubricating chamber during a condition of high load on said sliding surfaces for supplying lubricating oil to said lubricating chamber and sliding surfaces and including means for limiting the pressure of the supplied lubricating oil, wherein said pressure limiting means includes pressure relief valve means for preventing the supply of oil to the lubricating chamber at pressures above and below a predetermined range.

9. The transmission of claim 8, wherein said pressure relief valve means includes a first relief valve for supplying oil only when the pressure exceeds a predetermined magnitude in the oil supply from the closed hydraulic circuit.

10. A hydraulically operated continuously variable transmission of the type having a swash plate type hydraulic pump and a swash plate type hydraulic motor connected by a closed hydraulic circuit, comprising: a lubricating chamber communicating with a sliding surface of the swash plate of at least one of said hydraulic pump and said hydraulic motor, and means for selectively connecting said closed hydraulic circuit to said lubricating chamber during a condition of high load on said sliding surfaces for supplying lubricating oil to said lubricating chamber and sliding surfaces and including means for limiting the pressure of the supplied lubricating oil, wherein said pressure limiting means includes pressure relief valve means for preventing the supply of oil to the lubricating chamber at pressures above or below a predetermined range.

wherein said pressure relief valve means includes a first relief valve for supplying oil only when the pressure exceeds a predetermined magnitude in the oil supply from the closed hydraulic circuit, and wherein said pressure relief valve means includes a second relief valve for preventing the oil pressure in the oil supplied to said lubricating chamber from exceeding a predetermined level.

11. A hydraulically operated continuously variable transmission of the type having a swash plate type hydraulic pump and a swash plate type hydraulic motor connected through a closed hydraulic circuit, said pump having pump plungers held in slidable contact with said pump swash plate, said motor having motor plungers held in slidable contact with said motor swash plate, comprising: a lubricating chamber surrounding the sliding surfaces of the swash plate and plungers of at least one of said hydraulic pump and said hydraulic motor; means for selectively connecting said closed hydraulic circuit to said lubricating chamber during a condition of high load on said sliding surfaces for supplying lubricating oil to said lubricating chamber and said sliding surfaces; and means for limiting the pressure of the supplied lubricating oil, wherein said pressure limiting means includes pressure relief valve means for preventing the supply of oil to the lubricating chamber at pressures above and below a predetermined range.

12. The transmission of claim 11, wherein said pressure relief valve means includes a first relief valve for supplying oil only when the pressure exceeds a predetermined magnitude in the oil supply from the closed hydraulic circuit.

13. A hydraulically operated continuously variable transmission of the type having a swash plate type hydraulic pump and a swash plate type hydraulic motor connected through a closed hydraulic circuit, said pump having pump plungers held in slidable contact with said pump swash plate, said motor having motor plungers held in slidable contact with said motor swash plate, comprising:
- a lubricating chamber surrounding the sliding surfaces of the swash plate and plungers of at least one of said hydraulic pump and said hydraulic motor;
- means for selectively connecting said closed hydraulic circuit to said lubricating chamber during a condition of high load on said sliding surfaces for supplying lubricating oil to said lubricating chamber and said sliding surfaces; and
- means for limiting the pressure of the supplied lubricating oil;
- wherein said pressure limiting means includes pressure relief valve means for preventing the supply of oil to the lubricating chamber at pressures above or below a predetermined range;
- wherein said pressure relief valve means includes a first relief valve for supplying oil only when the pressure exceeds a predetermined magnitude in the oil supply from the closed hydraulic circuit; and
- wherein said pressure relief valve means includes a second relief valve for preventing the oil pressure in the oil supplied to said lubricating chamber from exceeding a predetermined level.

* * * * *